(12) United States Patent
Villgrattner et al.

(10) Patent No.: US 12,358,048 B2
(45) Date of Patent: Jul. 15, 2025

(54) METHOD FOR DETERMINING A PARAMETER OF A MATERIAL AND PRESSING TOOL FOR THE PRODUCTION OF A GREEN COMPACT

(71) Applicant: GKN Sinter Metals Engineering GmbH, Radevormwald (DE)

(72) Inventors: Thomas Villgrattner, Brixen (IT); Roland Oberleiter, Uttenheim/Gais (IT)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 431 days.

(21) Appl. No.: 17/726,341

(22) Filed: Apr. 21, 2022

(65) Prior Publication Data

US 2022/0339699 A1    Oct. 27, 2022

(30) Foreign Application Priority Data

Apr. 22, 2021 (EP) ..................................... 21169886

(51) Int. Cl.
*B22F 3/03* (2006.01)
*B22F 3/00* (2021.01)
(Continued)

(52) U.S. Cl.
CPC ................ *B22F 3/03* (2013.01); *B22F 3/004* (2013.01); *B30B 11/005* (2013.01); *G01F 1/86* (2013.01);
(Continued)

(58) Field of Classification Search
CPC ........ B22F 3/03; B22F 3/004; B22F 2203/15; B22F 2998/10; B30B 11/005;
(Continued)

(56) References Cited

U.S. PATENT DOCUMENTS 4,946,634 A * 8/1990 Shaner .................. B30B 11/005
425/149
5,302,340 A * 4/1994 Takeda .................. C23C 24/082
427/205
(Continued)

FOREIGN PATENT DOCUMENTS

CH        716048 A2    10/2020
CN    203253924 U  * 10/2013  .............. B22F 3/003
(Continued)

OTHER PUBLICATIONS

CN_203253924 (Year: 2013).*
(Continued)

*Primary Examiner* — Peter J Macchiarolo
*Assistant Examiner* — Monica S Young
(74) *Attorney, Agent, or Firm* — Quarles & Brady LLP

(57) ABSTRACT

At least one parameter of a material is determined with a pressing tool usable for producing a green compact and a pressing tool for producing at least one green compact. The pressing tool has at least one planar surface which is formed at least in part by a die which, starting from the surface, extends along an axial direction and, on the surface, has a cavity which extends from the surface along the axial direction and has an inner circumferential surface; wherein the cavity forms a receptacle for a powdery material which can be pressed in the cavity by at least one punch plunging into the cavity along the axial direction to form the green compact.

17 Claims, 1 Drawing Sheet

(51) Int. Cl.
   *B30B 11/00* (2006.01)
   *G01F 1/86* (2006.01)
   *G01F 11/28* (2006.01)
   *G01F 13/00* (2006.01)
   *G01F 15/02* (2006.01)
(52) U.S. Cl.
   CPC ............ *G01F 11/28* (2013.01); *G01F 13/001* (2013.01); *G01F 13/006* (2013.01); *G01F 15/02* (2013.01); *B22F 2203/15* (2013.01); *B22F 2998/10* (2013.01)
(58) Field of Classification Search
   CPC ......... B30B 15/304; G01F 1/86; G01F 11/28; G01F 13/001; G01F 13/006; G01F 15/02
   USPC .......................................................... 73/861
   See application file for complete search history.

(56) References Cited

U.S. PATENT DOCUMENTS

| | | | | |
|---|---|---|---|---|
| 2001/0022944 A1* | 9/2001 | Hinzpeter | ............. | B30B 11/005 419/14 |
| 2003/0041749 A1* | 3/2003 | Hinzpeter | ............... | B30B 15/22 100/269.01 |
| 2008/0020082 A1* | 1/2008 | Plucinski | ................ | B30B 11/02 425/78 |

FOREIGN PATENT DOCUMENTS

| | | | | | |
|---|---|---|---|---|---|
| DE | 19935402 | A1 | | 2/2001 | |
| DE | 102009025779 | A1 | | 11/2010 | |
| DE | 102013010836 | A1 | | 1/2015 | |
| EP | 1287975 | A2 | | 3/2003 | |
| EP | 2361758 | A2 | | 8/2011 | |
| EP | 3783448 | A1 | | 2/2021 | |
| JP | 3059406 | B2 | * | 7/2000 | |
| JP | 2004243401 | A | * | 9/2004 | ........... B29C 43/006 |
| JP | H11104895 | A | * | 9/2004 | |
| WO | WO-9835806 | A1 | * | 8/1998 | ............. B22F 3/004 |
| WO | 2019002598 | A1 | | 1/2019 | |
| WO | 2020146416 | A2 | | 7/2020 | |
| WO | WO-2020207645 | A1 | * | 10/2020 | ........... B30B 11/005 |

OTHER PUBLICATIONS

Translation_JP_2004243401 (Year: 2004).*
European Patent Office, Extended European Search Report, Application No. 21169886.5, Oct. 14, 2021, 18 pages.
Meyer D et al: "Auslegung Von Presswerkzeugen Mit Fem", Voi Z, Springer Voi Verlag, DE, Sep. 1, 1999, 141(7/8) 42-45, XP001011889 [No English Translation Available].

* cited by examiner

METHOD FOR DETERMINING A PARAMETER OF A MATERIAL AND PRESSING TOOL FOR THE PRODUCTION OF A GREEN COMPACT

CROSS-REFERENCE TO RELATED APPLICATIONS

This application claims priority to European Patent Application No. 21 169 886.5 filed Apr. 22, 2021, the disclosure of which is incorporated herein by reference in its entirety and for all purposes.

TECHNICAL FIELD

The disclosure relates to a method for determining at least one parameter of a material with a pressing tool usable for producing a green compact. The disclosure also relates to a pressing tool for producing at least one green compact.

BACKGROUND

A pressing tool has a flat/planar surface which is at least partially formed by a die which, starting from the surface, extends along an axial direction and, at the surface, has a cavity which extends from the surface along the axial direction and has an inner circumferential surface. The cavity forms a receptacle for a powdery material, which can be pressed in the cavity by at least one punch plunging into the cavity along the axial direction to form the green compact. A pressing tool can also have several punches that are moved along the axial direction and plunge into the die from one side or from opposite sides.

A pressing tool is used in particular to produce green compacts which can be sintered or which can be further processed as required (e.g. by heat treatment), i.e. green compacts which can be sintered after the pressing process, for example. In particular, metallic and/or ceramic powders can be pressed into green compacts in the die. In particular, the method can be used to operate the pressing die and to produce the green compact. In particular, the pressing tool can be used to produce the green compact.

With a pressing tool, a green compact can be formed from the powdery material in a first step by means of the application of force (via the at least one punch) and a negative mold (formed by the inner circumferential surface of the die and the at least one punch). A final product can be generated from this green compact in further process steps.

SUMMARY

The powder material, in particular its parameters or properties filling density and flow rate, have a considerable influence on the quality of the green compacts produced. These parameters change, among other things, as a function of the service life (aging and slumping) of the material, the temperature of the material, the degree of filling of a storage container for preloading the material, etc.

Up to now, these two parameters have been measured, for example, by means of a so-called Hall-flowmeter, usually manually. Due to the effort involved, measurements of the filling density and flow rate in a series production of green compacts (e.g. comprising the production of at least 500 green compacts directly one after the other, i.e. without the intermediate production of other green compacts with this press tool) are not carried out, but only the values from the data sheet of the powder are taken "just once". Ideally, the essential properties such as filling density and flow rate of the material are constant and thus known at any time during production. This means that the molding press used (the pressing tool) can be adjusted accordingly and a high quality of the green compacts produced can be set. Fluctuations in properties are indirectly determined by quality fluctuations in the green compacts, so that countermeasures can only be taken with a certain process hysteresis.

A measuring device for determining a parameter of a material is, for example, a Hall-flowmeter. Such a Hall-flowmeter is used to determine a density as well as a Hall-flowrate of a powdery material. The Hall-flowmeter comprises a funnel with an outlet opening. Via the standardized funnel and the standardized outlet opening, a time can be determined in which a predetermined volume of a powdery material flows out of the funnel via the outlet opening (see also DIN EN ISO 3923; DIN EN ISO 4490; DIN EN ISO 14629; ASTM B212; ASTM B213; ASTM B417).

On this basis, it is the task of the present disclosure to at least partially solve the problems described with reference to the prior art. In particular, a method for determining a parameter of a material is to be proposed by which the parameters can also be determined during series production of a large number of green compacts. Furthermore, a pressing tool suitably designed for this purpose is to be proposed.

To solve this task, a method and a pressing tool are proposed in the independent claims. Advantageous further embodiments are the subject of the dependent claims. The features listed individually in the claims can be combined with one another in a technologically useful manner and can be supplemented by explanatory facts from the description and details from the figures, whereby further embodiments of the invention are shown.

A method for determining at least one parameter of a material with a pressing tool usable for producing a green compact is proposed. The pressing tool has at least
- a working plane with at least one planar surface,
- a die which at least partially forms the surface,
- a punch movable relative to the surface along an axial direction,
- a filling shoe for providing a powdery material, and
- a measuring device for determining the parameter of the material used to produce the green compact.

The die extends from the surface along the axial direction and has at the surface a cavity extending from the surface along the axial direction and having an inner circumferential surface. The cavity forms a receptacle for the powdered material, which can be pressed into the green compact in the cavity by at least the punch plunging into the cavity along the axial direction. The filling shoe is movable along the surface. The press tool has an opening on the surface and along a radial direction next to the cavity, at which the measuring device is arranged. The measuring device has a constant volume immediately adjoining the surface and the opening, with a closable outlet opening. The method comprises at least the following steps:

a) filling the filling shoe with the material, e.g. from a storage container;
b) moving the filling shoe over the surface and across the opening;
c) at least partially filling the volume with the material from the filling shoe via the opening;
d) carrying out the determination of the at least one parameter by the measuring device and removing the material from the volume via the outlet opening.

The above (non-exhaustive) classification of the method steps into a) to d) is primarily intended only for differentiation and does not enforce any sequence and/or dependence. The frequency of the method steps, e.g. during operation of the pressing tool, can also vary. It is also possible for method steps to at least partially overlap one another in terms of time. Very preferably, method steps a) and b) and/or b) and c) take place at least partially simultaneously. Step d) can be conditional and, if necessary, can only be carried out if the volume is completely filled after at least step c) (and possibly also step b), and possibly also step a)) has been carried out several times. Step a) can be carried out with a lower frequency than steps b) and c), possibly with a lower, higher or the same frequency as step d). In particular, steps a) to d) are carried out in the sequence indicated, whereby in particular repeated repetitions of individual steps or the intermediate carrying out of further method steps is possible. In particular, step d) is only carried out when the volume is completely filled with the material. In particular, step a) is only carried out if the current filling volume of the filling shoe is not sufficient for the production of at least or exactly one green compact.

The pressing tool is designed in particular for the production of sinterable green compacts or green compacts which can be further processed as desired (e.g. by heat treatment). In particular, metallic and/or ceramic powders can be pressed into green compacts in the die. In particular, the method can be used to operate the pressing tool and to produce the green compact. In particular, the pressing tool can be used to produce the green compact.

With the pressing tool, a green compact can be formed from the powdered material by means of the application of force (via the at least one punch) and a negative mold (formed by the inner circumferential surface of the die and the at least one punch). From this green compact, a final product can be generated in further process steps. One punch or a plurality of punches may be provided. The punches can enter the die from one side or from opposite sides.

A filling shoe is known in principle. It is used to hold the powder material, which is conveyed through the filling shoe to the cavity. The filling shoe moves parallel to the surface, in particular along the surface. The filling shoe can be designed to be open towards the surface so that, as soon as the filling shoe is at least partially positioned above the cavity, the material can exit from the filling shoe into the receptacle formed by the cavity. The exact amount of material predetermined for the one green compact may be provided in the filling shoe. Alternatively, the exact volume of material may be defined by the receptacle itself, i.e. the receptacle is completely filled by the material and the filling shoe acts as a wiper. In this case, a larger quantity of material can also be held in the filling shoe.

After filling of the receptacle, the filling shoe is moved away from the working area of at least one die, and the die is moved to compress the material and form the green compact. The green compact is ejected from the die and fed for further processing, if required. After each pressing operation, the filling shoe is moved towards the cavity to fill the receptacle.

The measuring device is arranged on the press die so that, in particular, the material used for pressing a green compact can be checked in the measuring device before, after or during pressing. In particular, a partial volume of the material present in the filling shoe is transferred to the volume of the measuring device.

In particular, the filling shoe is filled in a starting position in step a), moved from the starting position to the opening in step b), and moved back to the starting position after step c) in a step i).

In particular, the filling shoe is moved towards the cavity before step b), immediately after step b) or immediately after step c) in a step ii) and the receptacle is filled from the filling shoe. In particular, the at least one punch plunges into the cavity for pressing the material and producing the green compact after step ii) in a step iii).

In particular, during a production of a plurality of green compacts, i.e., for example, of at least 100, preferably at least 500, particularly preferably at least 1,000, step ii) is performed with a greater frequency than step c). In particular, therefore, several green compacts are produced before the volume of the measuring device is filled again.

In particular, the volume is completely filled in step c).

The opening may be arranged along a predetermined travel path of the filling shoe in the working plane of the pressing tool. In particular, the opening may be arranged along the travel path between the starting position and the cavity, so that the filling shoe passes over the opening each time the receptacle is filled. In particular, however, the starting position can also be arranged between the cavity and the opening, so that the filling shoe must be moved in a separate movement towards the opening.

The measurement of the at least one parameter, in particular the filling density and/or the flow rate, is carried out in particular for each component or green compact. However, the measurement can also be carried out only for a predeterminable quantity of green compacts and in particular in a freely determinable distribution.

In particular, a lid, e.g. a slide that can be displaced parallel to the working plane, is provided at the opening so that the volume of the measuring device is released only for a partial quantity of the green compacts produced and measurement of the parameter is made possible.

In particular, this cover is not required if the filling shoe is only moved towards the opening as part of a separate movement.

In particular, the volume of the measuring device is partially filled for each green compact or always after pressing a plurality of green compacts. Thus, in particular, an average value of the at least one parameter can be formed, e.g. over several fillings of the filling shoe or over several powder batches.

In particular, the at least one parameter can only be determined at intervals, whereby a plurality or different numbers of green compacts are produced between the measurements. Depending on a deviation of the determined values for the at least one parameter, the measurement intervals can be dynamically adjusted.

In particular, the measuring intervals are adjusted as a function of a filling level of the material in the storage container. In particular, the measuring intervals can be shortened shortly before and after a change or refilling of the material in the storage container.

The level of material in the storage container can be calculated, for example, by means of laser triangulation, weight, pressure, etc., or by multiplying a known part weight of a green compact by the number of pieces produced.

If the pressing tool is idle for a longer period, i.e. if no green compacts are produced for a longer period, the material in the filling shoe and/or in the storage container can change its properties. For this reason, the measuring intervals can be reduced when the pressing tool is restarted, or measurements can be carried out for all green compacts at the start of renewed green compact production.

However, the at least one parameter can be determined independently of the production of green compacts. In this case, in particular, no green compacts are produced, but the filling shoe is only used to fill the measuring device. Alternatively, the measuring device can also be filled by hand.

The measuring device is used in particular to determine a parameter of a material. The measuring device is designed in particular in the manner of a Hall-flowmeter. Such a Hall-flowmeter serves to determine a density as well as a Hall-flow rate of a powdery material. A Hall-flowmeter comprises a funnel with the volume and with an outlet opening. Via the standardized funnel and the standardized outlet opening, a time can be determined in which a predetermined volume of a powdery material flows out of the funnel via the outlet opening.

The measuring device can be used in particular to continuously and automatically measure a filling density and the flow rate during the production of green compacts. The measuring device, preferably a Hall-flowmeter, can be mounted very close to the die of the press tool, in particular below the cover plate (i.e. the working plane). This allows a standard filling shoe to be used to fill the volume of the measuring device. The material is discharged from the volume via an outlet opening which can be closed, e.g. by a slide or a flap. Thus, the volume of the material to be measured is structurally predetermined by the measuring device.

The Hall-flowmeter (together with the necessary accessories) can be mounted in particular on a scale, e.g. a bending beam with strain gauges. This allows the mass of the material placed in the volume to be measured. From the quotient of (measured) mass and (known) volume, the filling density can be calculated.

By opening the outlet opening, the Hall-flowmeter or its volume is emptied. The time required for the material to flow out of the volume can be determined, for example, by means of a light barrier triggering a stopwatch. To determine the flow rate, the measured time and the measured mass are converted to a normalized mass sample of 50 grams using a rule of three.

In particular, the pressing tool comprises a control device by which a sequence and frequency of at least steps a), b), c) and d) are determined in dependence on at least the following boundary conditions:
  a value of the at least one determined parameter;
  a specification for the determination (e.g. predetermined measurement frequency, predetermined distribution of measurements over a production quantity);
  a filling level of the material in the storage container or a refilling process of the storage container;
  a time interval during which the material is stored in the storage container or in the filling shoe.

A pressing tool for producing at least one green compact is further proposed. The pressing tool has at least a planar surface formed at least in part by a die extending from the surface along an axial direction and having at the surface a cavity extending from the surface along the axial direction and having an inner circumferential surface. The cavity forms a receptacle for a powdered material, which can be pressed in the cavity by at least one punch plunging into the cavity along the axial direction to form the green compact. The pressing tool has an opening at the surface and along a radial direction next to the cavity, at which opening a measuring device is arranged for determining a parameter of the material used to produce the green compact.

The radial direction runs in particular transversely to the axial direction.

In particular, the parameter is at least a flow rate or a density of the material.

In particular, the measuring device has a constant volume directly adjoining the surface and the opening and having a closable outlet opening, so that the material can be filled into the volume via the opening and can be discharged from the volume via the outlet opening. The measuring device comprises at least a first sensor or a second sensor. The first sensor is used to detect the flow rate, which detects the discharge of the material via the outlet opening. For example, the first sensor may comprise a light barrier by which a time in which the volume can be emptied can be determined. The second sensor is used to detect the weight of the material in the volume so that the density can be determined therefrom. For example, the second sensor may comprise a strain gauge.

In particular, the opening can be closed by a cover.

In particular, the pressing tool additionally comprises a filling shoe for providing the powdered material, wherein the filling shoe is movable along the surface; wherein the filling shoe is movable over the cavity for filling the cavity and over the opening for filling the measuring device.

In particular, the filling shoe has a starting position in which the filling shoe can be filled from a storage container for the material, wherein the opening is arranged between the starting position and the cavity or the starting position is arranged between the cavity and the opening.

In particular, the pressing tool additionally comprises the punch movable relative to the surface along the axial direction, a filling shoe for providing the powdered material, and a control device which is set up to carry out the method described.

In particular, a control device is proposed which is equipped, configured or programmed to carry out the method.

Further, the method can also be carried out by a computer or with a processor of a control unit or the formerly mentioned control device.

Accordingly, a system for data processing is also proposed comprising a processor adapted/configured to perform the method or a part of the steps of the proposed method.

A computer-readable storage medium may be provided comprising instructions which, when executed by a computer/processor, cause the computer/processor to perform the method or at least part of the steps of the proposed method.

The explanations concerning the method are in particular transferable to the pressing tool, the control device and/or the computer-implemented method (i.e. the computer or the processor, the system for data processing, the computer-readable storage medium) and vice versa.

The use of indefinite articles ("a", "an"), in particular in the claims and the description reproducing them, is to be understood as such and not as number words. Accordingly, terms or components introduced therewith are to be understood in such a way that they are present at least once and, in particular, may be present several times.

As a precaution, it should be noted that the number words used here ("first", "second", . . . ) primarily serve (only) to distinguish between several similar objects, variables or processes, i.e. in particular they do not necessarily specify a dependency and/or sequence of these objects, variables or processes with respect to one another. If a dependency and/or sequence is required, this is explicitly indicated here or it obviously results for the person skilled in the art when studying the concretely described embodiment. As far as a component may occur several times ("at least one"), the description for one of these components may be valid for all or part of the plurality of these components, however, this is not mandatory.

BRIEF DESCRIPTION OF THE DRAWINGS

The invention and the technical environment are explained in more detail below with reference to the figures. It should be noted that the invention is not to be limited by the embodiments shown. In particular, unless explicitly shown otherwise, it is also possible to extract partial aspects of the facts explained in the figures and to combine them with other components and findings from the present description and/or figures. In particular, it should be noted that the figures and especially the proportions shown are only schematic. Identical reference signs designate identical objects, so that explanations from other figures can be used as a supplement if necessary. The figures show.

DETAILED DESCRIPTION

Figure 1:
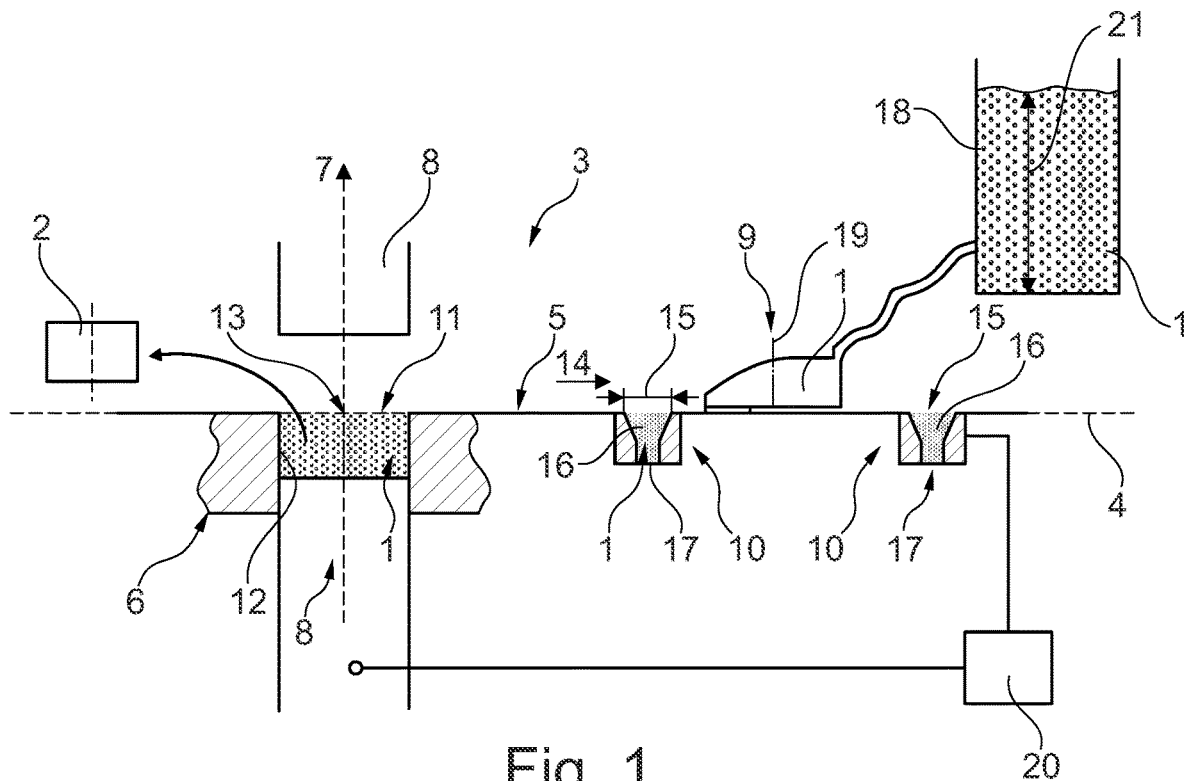
FIG. 1: a side view of a press tool in section.
Figure 2:
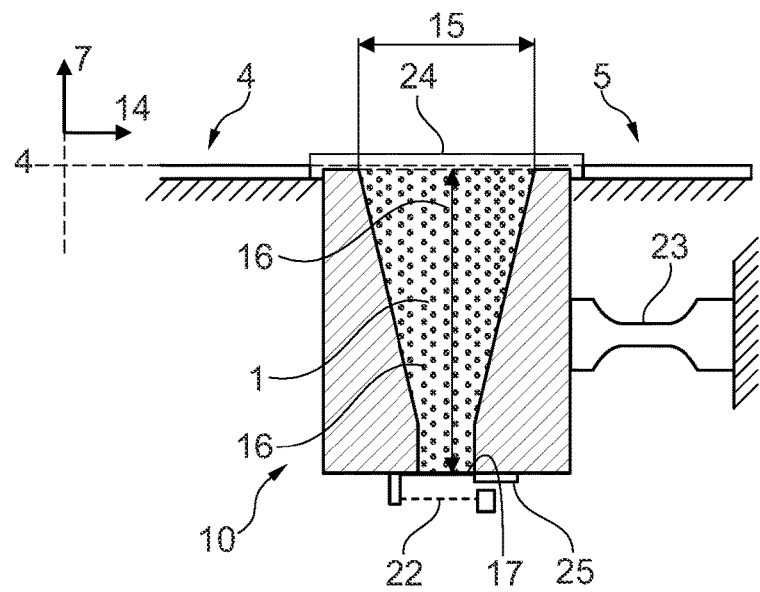
FIG. 2: a section of the working plane in a side view in cross section.

FIG. 1 shows a press tool 3 in a side view in section. FIG. 2 shows a section of the working plane 4 or the pressing tool 3 in a side view in section. FIGS. 1 and 2 are described together below.

The pressing tool 3 comprises the punches 8 movable relative to the surface 5 along the axial direction 7, a filling shoe 9 for providing the powdery material 1, and a control device 20 which is set up to carry out the process described.

The pressing tool 3 has a flat/planar surface 5, which is formed in part by a die 6, which extends from the surface 5 along an axial direction 7 and has on the surface 5 a cavity 11 extending from the surface along the axial direction 7 and having an inner circumferential surface 12. The cavity 11 forms a receptacle 13 for a powdered material 1, which can be pressed into the green compact 2 in the cavity 11 by two punches 8 plunging into the cavity 11 along the axial direction 7. The pressing tool 3 has an opening 15 on the surface 5 and along a radial direction 14 next to the cavity 11, on which a measuring device 10 is arranged for determining a parameter of the material 1 used to produce the green compact 2.

The measuring device 10 has a constant volume 16 directly adjoining the surface 5 and the opening 15, with a closable outlet opening 17, so that the material 1 can be filled into the volume 16 via the opening 15 and discharged from the volume 16 via the outlet opening 17. The measuring device 10 has a first sensor 22 and a second sensor 23. The first sensor 22 (e.g., light source, light beam, sensor) is used to detect the flow rate, which detects the discharge of the material 1 via the outlet opening 17. The second sensor 23 is used to detect the weight of the material 1 in the volume 16, so that the density can be determined therefrom.

The opening 15 may be closable by a cover 24 (see FIG. 2).

The pressing tool 3 comprises a filling shoe 9 for providing the powdered material 1, the filling shoe 9 being movable along the surface 5. The filling shoe 9 is arranged to be movable on the working plane 4 for filling the cavity 11 via the cavity 11 and for filling the measuring device 10 via the opening 15.

The filling shoe 9 has a starting position 19 (see FIG. 1) in which the filling shoe 9 can be filled from a storage container 18 for the material 1, the opening 15 being arranged between the starting position 19 and the cavity 11 (see FIG. 1, left position of the measuring device 10) or the starting position 19 being arranged between the cavity 11 and the opening 15 (see FIG. 1, right position of the measuring device 10).

According to step a) of the method, filling of the filling shoe 9 with the material 1 from the storage container 18 takes place. According to step b), movement of the filling shoe 9 over the surface 5 and over the opening 15 takes place. According to step c), at least partial filling of the volume 16 with the material 1 from the filling shoe 9 via the opening 15 takes place. According to step d), the determination of the at least one parameter is carried out by the measuring device 10 and the material 1 is removed from the volume 16 via the outlet opening 17. The outflow of the material 1 from the volume 16 is carried out via an outlet opening 17 which can be closed by a slide 25. Thus, the volume 16 of the material 1 to be measured is structurally predetermined by the measuring device 10.

The filling shoe 9 is filled in a starting position 19 in step a), moved from the starting position 19 to the opening 15 in step b) and moved back to the starting position 19 after step c) in a step i).

The filling shoe 9 can be moved towards the cavity 11 before step b), immediately after step b) or immediately after step c) in a step ii) and the receptacle 13 can be filled from the filling shoe 9. The punches 8 plunge into the cavity 11 for pressing the material 1 and producing the green compact 2 after step ii) in a step iii).

The second sensor 23 of the measuring device 10 comprises a bending beam with strain gauges. This allows the mass of the material 1 arranged in the volume 16 to be measured. From the quotient of (measured) mass and (known) volume 16, the filling density can be calculated.

By opening the outlet opening 17, the volume 16 is emptied. The time required for the material 1 to flow out of the volume 16 can be determined with the first sensor 22, a light barrier that triggers a stopwatch. To determine the flow rate, the measured time and the measured mass are converted to a normalized mass sample of 50 grams using a rule of three. The measuring device 10 can be operated via the control device.

LIST OF REFERENCE SIGNS

1 Material
2 Green compact
3 Pressing tool
4 Working plane
5 Surface
6 die
7 axial direction
8 punch
9 filling shoe
10 measuring device
11 cavity
12 inner circumferential surface
13 receptacle
14 radial direction
15 opening
16 volume
17 outlet opening
18 storage container
19 starting position
20 Control device
21 filling level
22 first sensor 23 second sensor
24 lid
25 slider

The invention claimed is:

1. A method for determining at least one parameter of a powdery material with a pressing tool which can be used for producing a green compact, the pressing tool having at least one working plane with at least one planar surface, a die which at least partially forms the surface, a punch movable relative to the surface along an axial direction, a filling shoe for providing the powdery material, and a measuring device for determining the parameter of the powdery material used for producing the green part; wherein the die extends from the surface along the axial direction and has at the surface a cavity extending from the surface along the axial direction and having an inner circumferential surface; the cavity forming a receptacle for the powdery material, which can be pressed in the cavity into the green compact by at least the punch plunging into the cavity along the axial direction; the filling shoe being movable along the surface; wherein the measuring device has an opening at the surface, an outlet opening that is closeable, and a constant volume directly adjoining the opening at the surface and the outlet opening; wherein the opening at the surface for the measuring device is spaced from the cavity along a radial direction; wherein the method comprises at least the following steps:
  a) filling the filling shoe with the powdery material from a storage container;
  b) moving the filling shoe over the surface and across the opening of the measuring device;
  c) at least partially filling the constant volume of the measuring device with the powdery material from the filling shoe via the opening of the measuring device;
  d) carrying out the determination of the at least one parameter of the powdery material by the measuring device and removing the powdery material from the constant volume of the measuring device via the outlet opening of the measuring device.

2. The method according to claim 1, wherein the filling shoe is filled in step a) in a starting position, is moved in step b) from the starting position to the opening of the measuring device, and is moved after step c) in a step i) back to the starting position.

3. The method according to claim 2, the method further comprising a step ii) in which the filling shoe is moved towards the cavity and the receptacle is filled from the filling shoe; wherein the step ii) occurs before step b), immediately after step b), or immediately after step c); wherein the method further comprising a step iii) in which the punch plunges into the cavity for pressing the powdery material and for producing the green compact; wherein step iii) occurs after step ii).

4. The method according to claim 3, wherein during a production of a plurality of green compacts, step ii) is performed with a greater frequency than step c).

5. The method according to claim 1, wherein the constant volume of the measuring device is completely filled in step c).

6. The method according to claim 1, wherein the pressing tool comprises a control device by which a sequence and frequency of at least steps a), b), c) and d) is determined as a function of at least the following boundary conditions:
  a value of the at least one determined parameter of the powdery material;
  a specification for the determination;
  a filling level of the powdery material in the storage container;
  a time interval during which the powdery material is stored in the storage container or in the filling shoe.

7. The method according to claim 1, wherein the at least one parameter is of the powdery material in loose un-compacted powder form.

8. The method according to claim 7, wherein in step d) removing the powdery material from the constant volume of the measuring device via the outlet opening involves flowing the powdery material out of the outlet opening.

9. A pressing tool for producing at least one green compact, the pressing tool having at least one planar surface which is formed at least partially by a die which, starting from the surface, extends along an axial direction and, on the surface, has a cavity which extends from the surface along the axial direction and has an inner circumferential surface; wherein the cavity forms a receptacle for a powdery material which can be pressed into the green compact in the cavity by at least one punch plunging into the cavity along the axial direction; wherein a measuring device for determining a parameter of the powdery material has an opening at the surface, the opening at the surface being spaced from the cavity along a radial direction, wherein the measuring device has a constant volume directly adjoining the surface and the opening and having an outlet opening that is closeable, so that the powdery material is fillable into the volume via the opening and is dischargeable as powdery material from the volume via the outlet opening.

10. The pressing tool according to claim 9, wherein the parameter of the powdery material is at least a flow rate or a density of the powdery material.

11. The press tool according to claim 10, wherein the measuring device has at least a first sensor for detecting the flow rate, which detects the discharge of the powdery material via the outlet opening, or has a second sensor, which detects the weight of the powdery material located in the constant volume, so that the density can be determined therefrom.

12. The pressing tool according to claim 11, wherein the opening is closeable by a cover.

13. The pressing tool according to claim 9, additionally comprising a filling shoe for providing the powdery material, wherein the filling shoe is movable along the surface; wherein the filling shoe is movable over the cavity for filling the cavity and over the opening for filling the measuring device.

14. The press tool according to claim 13, wherein the filling shoe has a starting position in which the filling shoe is fillable from a storage container for the powdery material, wherein the opening of the measuring device is arranged between the starting position and the cavity or the starting position is arranged between the cavity and the opening of the measuring device.

15. The pressing tool according to claim 13, additionally comprising the punch movable relative to the surface along the axial direction and a control device which is set up to carry out a method including the steps of filling the filling shoe with the powdery material from a storage container; moving the filling shoe over the surface and across the opening of the measuring device; at least partially filling a constant volume of the measuring device with the powdery material from the filling shoe via the opening; and carrying out the determination of the at least one parameter of the powdery material by the measuring device and removing the powdery material from the constant volume via an outlet opening of the measuring device.

16. The pressing tool according to claim 15, wherein the at least one parameter is of the powdery material in loose un-compacted powder form.

17. The pressing tool according to claim 16, wherein removing the powdery material from the constant volume of the measuring device via the outlet opening the measuring device involves flowing the powdery material out of the outlet opening.

* * * * *